United States Patent [19]
Munz et al.

[11] Patent Number: 5,679,380
[45] Date of Patent: Oct. 21, 1997

[54] UNDERWATER PELLETIZING DIE PLATE

[75] Inventors: Rainer Munz, Schorndorf; Rainer Sauter, Remseck, both of Germany

[73] Assignee: Werner & Pfleiderer, GmbH, Germany

[21] Appl. No.: 623,920

[22] Filed: Mar. 28, 1996

[30]    Foreign Application Priority Data

Apr. 27, 1995 [DE] Germany .................. 195 15 473.8

[51] Int. Cl.⁶ ................................................ B29C 47/00
[52] U.S. Cl. .......................... 425/67; 425/311; 264/142
[58] Field of Search ..................... 425/67, 311, 463;
264/167, 147, 141, 142

[56]    References Cited

U.S. PATENT DOCUMENTS

| | | |
|---|---|---|
| 3,516,120 | 6/1970 | Braun et al. .................. 425/67 |
| 3,538,206 | 11/1970 | Hann .................. 264/167 |
| 3,599,286 | 8/1971 | Karet . |
| 4,123,207 | 10/1978 | Dudley . |
| 4,378,964 | 4/1983 | Wolfe . |
| 4,564,350 | 1/1986 | Holmes et al. . |
| 4,678,423 | 7/1987 | Bertolotti .................. 425/311 |

FOREIGN PATENT DOCUMENTS

| | | |
|---|---|---|
| 0293269 | 11/1988 | European Pat. Off. . |
| 2236823 | 6/1980 | Germany . |
| 3243332 | 1/1984 | Germany . |
| 461771 | 10/1968 | Sweden . |

*Primary Examiner*—Jay H. Woo
*Assistant Examiner*—Minh-Chau T. Pham
*Attorney, Agent, or Firm*—Laff, Whitesel, Conte & Saret, Ltd.

[57]    ABSTRACT

In an underwater pelletizing die plate or an extruder for the pelletizing of thermoplastics, the front face of the die plate, which is provided with a wearing protection layer and over which pass the pelletizing knives, being disposed under water, and heat isulation means being provided on the pelletizing die plate, good axial insulation is to be achieved, accompanied by uniform temperature distribution in the radial direction, it being provided to this end that an insulating layer is disposed between the external upper side of the actual pelletizing die plate and the wearing protection layer, the wearing protection layer being positioned, relative to the insulating layer, with radial play and without axial pressure or with little axial pressure, respectively.

16 Claims, 4 Drawing Sheets

UNDERWATER PELLETIZING DIE PLATE

BACKGROUND OF THE INVENTION

1. Field of the Invention

The invention relates to an underwater pelletizing die plate for an extruder for the pelletizing of thermoplastics, the front face of the die plate, which is provided with a wearing protection layer and over which pass the pelletizing knives, being disposed under water, and heat insulation means being provided on the pelletizing die plate.

2. Background Art

For the production of impeccable pellets, the thermoplastics to be pelletized must be kept above solidification temperature as long as to their exit from the holes or nozzles of the pelletizing die plate. However, this gives rise to problems due to the fact that the molten plastics must be cooled directly after the exit from the holes of the pelletizing die plate, to which end the above-mentioned cooling bath is used. Consequently, there is a considerable temperature drop from the outside to the inside of the pelletizing die plate.

For maintaining this temperature drop, pelletizing devices are known, in which the heat eliminated from the die plate by the coolant is continuously replaced. Enormous amounts of heat are supplied by intense heating of the die plate, the desired temperature characteristic frequently not being reached even with high heating capacities.

In connection with this issue, CH 461 771 A1 teaches to line each die hole, at least over part of its length, with a material that exhibits a lower conductivity than the die plate, such a heat insulating layer being meant to prevent the dissipation of heat to the cooled die plate. Porcelain or high-alloy special steel have been considered appropriate materials of this kind.

U.S. Pat. No. 3,599,286 specifies a pelletizing die plate, in which the nozzles are surrounded by a thermally insulating laminar layer extending as far as to the cutting face. In this way, the nozzles are insulated in the radial direction.

Beside the issue of the temperature characteristic in the axial direction, i.e. in the direction of extrusion or in the direction perpendicular to the surface of the pelletizing die plate, the temperature distribution in the plane of the pelletizing die plate or in the radial direction is of importance, too.

Since it is desirable to produce pellets as uniform as possible, the same conditions, in particular the same temperatures, must prevail at all the holes of the pelletizing die plate.

This request for a largely symmetric steel temperature about on a level with the melting temperature as far as to the cutting edge can be realized with water-ring pelletizing die plates, because the water transporting the pellets does not contact the face where the knives pass. Correspondingly, pellets of regular size are cut. However, experience has shown that in the case of low-viscous melts, no individual pellets can be produced with systems of this type because of the agglutination of the pellets, which is however possible with the underwater pelletizing systems of the species under regard. But these underwater pelletizing die plates pose the problem that no absolutely regular temperature distribution is achievable in the radial direction and circumferential direction, which is the case with virtually each of the various known constructions such as insulated die plates, heat exchanger die plates and heat channel die plates.

Another problem resides in that the wearing protection necessary for cutting on the die plate surface consists as a rule of brittle and thus thermally sensitive material, which will frequently lead to cracking in the underwater pelletizing die plates, as a result of which the radial temperature distribution is impaired and difficulties may occur in the cutting of low-viscous melts.

SUMMARY OF THE INVENTION

It is the object of the invention to embody an underwater pelletizing die plate such that a temperature above the melting temperature of the extruded material is reliably maintained in the axial direction as long as to the exit from the pelletizing die plate and that a uniform temperature level is ensured in the radial direction and in the circumferential direction over the entire pelletizing die plate.

According to the invention this object is attained in that between the external upper side of the actual pelletizing plate and the wearing protection layer, provision is made for an insulating layer on which the wearing protection layer is disposed, having radial play.

The design according to the invention offers a lot of advantages, it being possible to combine the properties of a water-ring pelletizing die plate in terms of heating symmetry, temperature level, melting pressure build-up and regularity of pellets with the advantages offered by an underwater pelletizing die plate in terms of its high throughputs of up to 50 metric tons per hour and its cutting, free from agglutination, of low-viscous polymer melts.

Owing to the design according to the invention, a high temperature level is maintained as far as to the wearing protection layer with a perfectly symmetric temperature profile throughout zone of melt flow. Due to the thermal insulation of the wearing protection layer, a low temperature level can be kept there, which leads to reduced thermal stresses and, consequently, to the preclusion of crackings in the wearing protection layer. Because of the comparatively cold face swept by the knives, reliable cutting without melt-film forming is attained with low-viscous polymer melts. Simultaneously, the insulating layer fulfills the function of ensuring the compensation of thermal stress between the actual pelletizing die plate and the wearing protection layer. Another important advantage is the ease of replacing the wearing protection layer worn out in operation.

The insulating layer preferably has a thickness of up to a few millimeters, thus corresponding approximately to the guide length of the melt exit hole of water-ring pelletizing die plates.

The insulating layer can be fastened by soldering, welding, gluing or by the methods used for ceramic materials such as evaporation coating, plasma spraying etc., or by screws, the latter way of fastening ensuring the compensation of expansion in the plane of the layer.

Known materials such as zirconium oxide can be used as insulating materials, the heat conductivity of which must be very low for sufficient insulation to be possible even with layer thicknesses of less than 1 mm.

Because of the comparatively low mechanical stability of insulating layers of this kind, it is not advisable to connect them directly with the wearing protection layer.

In particular with insulating layers of this kind, it is consequently provided that the wearing protection layer is retained on the insulating layer in the way of a floatingly supported, prestressed membrane, i.e. this layer is supported with radial play without any substantial pressure being exercised on it in the axial direction as seen in FIG. 2.

Details of the invention will become apparent from the ensuing description of a preferred exemplary embodiment, taken in conjunction with the drawing.

DESCRIPTION OF THE PREFERRED EMBODIMENT

Figure 1:
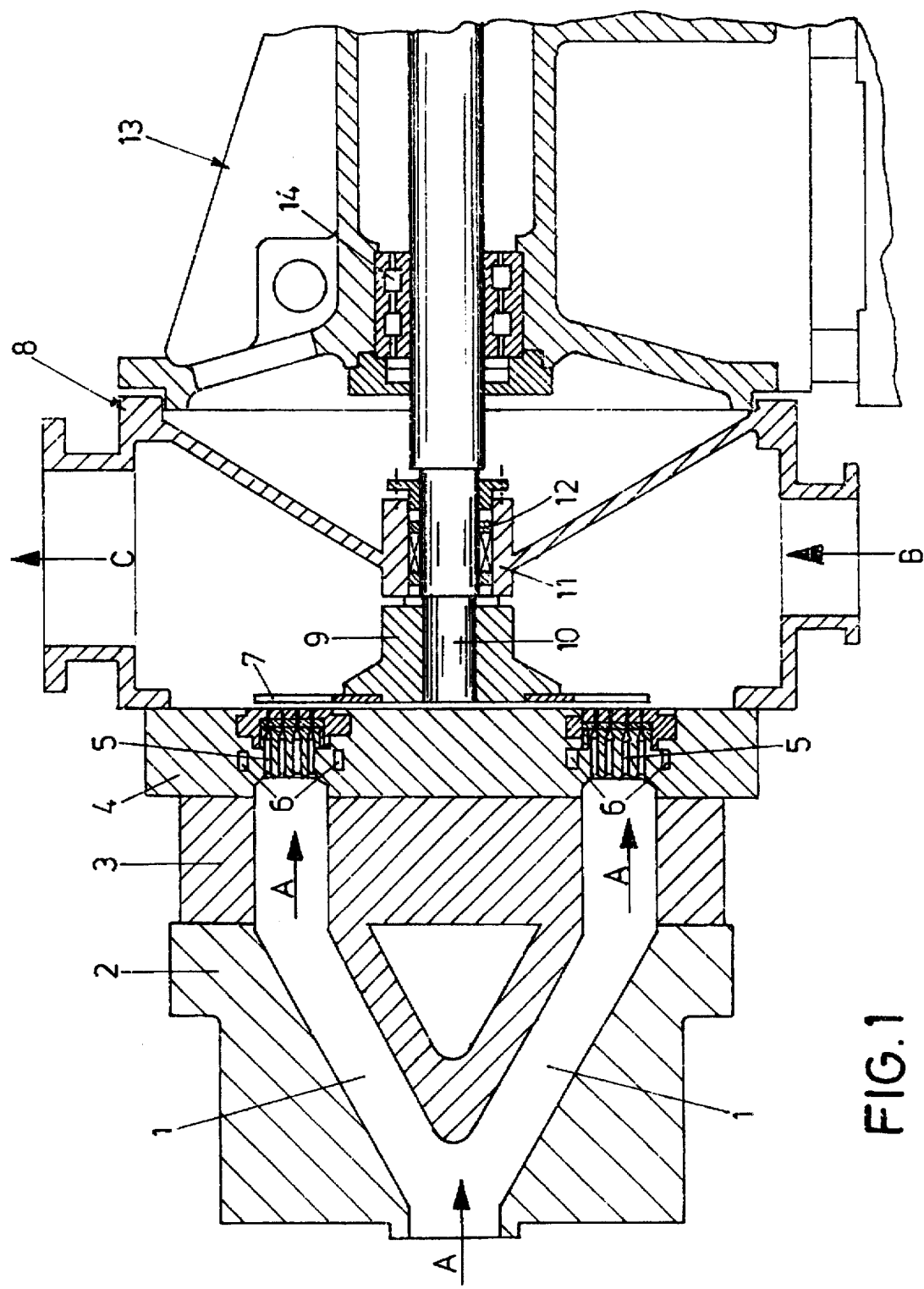
FIG. 1 is a section through an underwater pelletizing die plate of the generic type.

Plastic melt extruded by an extruder or any other feeding device (not shown in FIG. 1) flows through the channels 1 into a distributor 2 and through an intermediate plate 3 towards a pelletizing die plate 4. The arrows A show the direction of flow. The pelletizing die plate 4 has a number of die holes 5, through which the melt is forced. Ducts 6 ensure the flow of a heating agent.

After the exit from the die holes 5, the individual plastic strands are seized by rotating knives 7 and cut into pellets. For the exiting strands to have the necessary strength and so as to avoid agglutination of the pellets cut, the pelletizing operation takes place in a coolant, as a rule in water. A flow of coolant passes through a pelletizer cap 8, which comprises a cutting head 9 equipped with knives 7. The arrow B marks the entrance of the coolant into the pelletizer cap 8 and the arrow C marks the exit of the coolant inclusive of the pellets from the cap.

The cutting head 9 is mounted on a shaft 10, the passage of which through a reinforcement 11 of the wall of the pelletizer cap is provided with seals 12. A housing 13 shown only partially comprises bearings 14 for the shaft 10 of the cutting head 9 and is contiguous to a drive (not shown in the drawing) for the cutting head 9.

Figure 2:
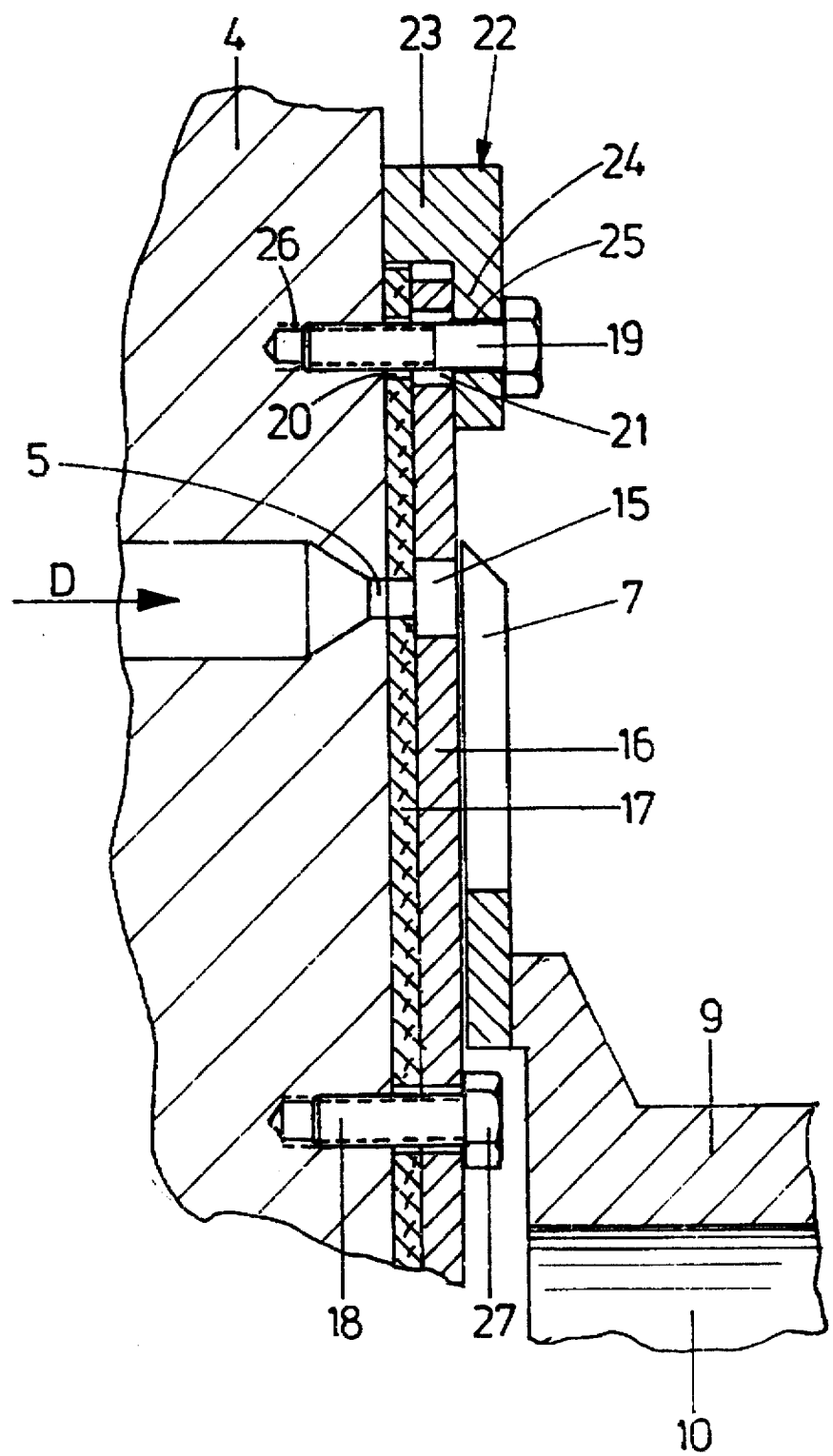
FIG. 2 is a sectional view on an enlarged scale for the illustration of the embodiment according to the invention.

The pelletizing die plate 4 shown by extracts in FIG. 2 has a number of die holes 5 (disposed in for instance concentrical circles), only one of which is shown in the drawing to simplify matters.

The molten plastic material enters on one side of these die holes 5 in the direction of the arrow D, a channel passing through the base body of the pelletizing die plate 4. This channel discharges into the hole 15 of the wearing protection layer 16, which is greater than the die hole 5 because of the different thermal expansion of the base body and the wearing protection layer and because of the latter's radial displaceability.

According to the invention, an insulating layer 17 is provided between the pelletizing die plate 4 and the wearing protection layer 16, the wearing protection layer 16 being arrested by screws 18, 19 in such a way that it has a certain radial play so that total compensation for expansion is possible between the wearing protection layer 16, the insulating layer 17 and the pelletizing die plate 4.

In the exemplary embodiment, this is accomplished by the screw 19 passing with little play 20 through a drill hole 21 of the wearing protection layer 16, the axial pressure being intercepted by a retainer and spacer element 22, which has a base body 23 extending in the direction of flow and an L-shaped projection 24 comprising a drill hole 25, which is also passed through by the screw 19, so that the tightening pressure of the screw 19, which reaches into a threaded hole 26, is intercepted.

The head 27 of the screw 18 overlaps the wearing protection layer 16 and the insulating layer 17 and provides for fixing in the axial direction.

Figure 3:
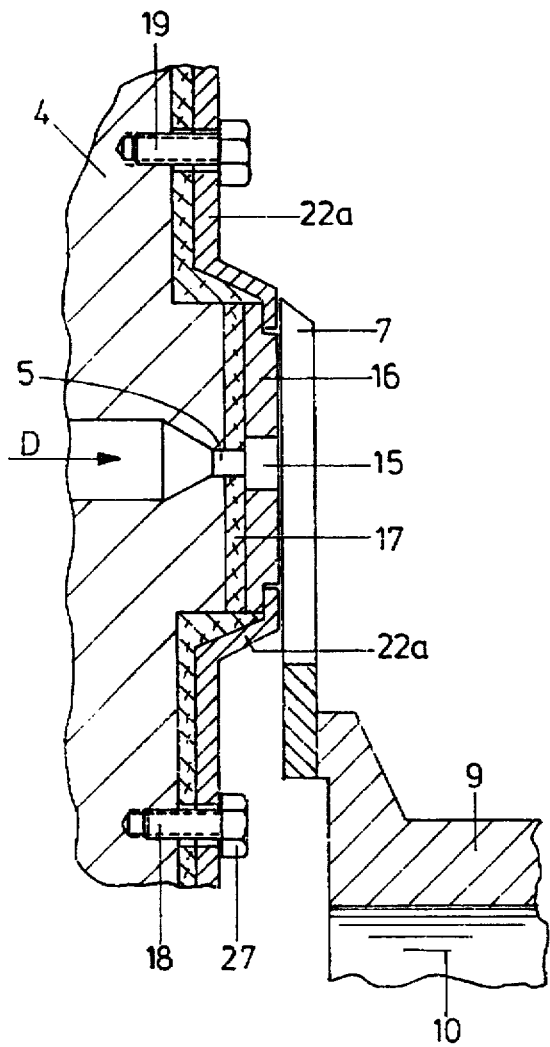
FIGS. 3 and 4 show further variants of the wearing protection layer of annular design.

In the variant shown in FIG. 3, the retainer and spacer elements 22a are approximately Z-shaped, one leg being penetrated by a fastening screw 18 and 19, respectively, and the other free leg lapping over the wearing protection layer 16.

Figure 4:
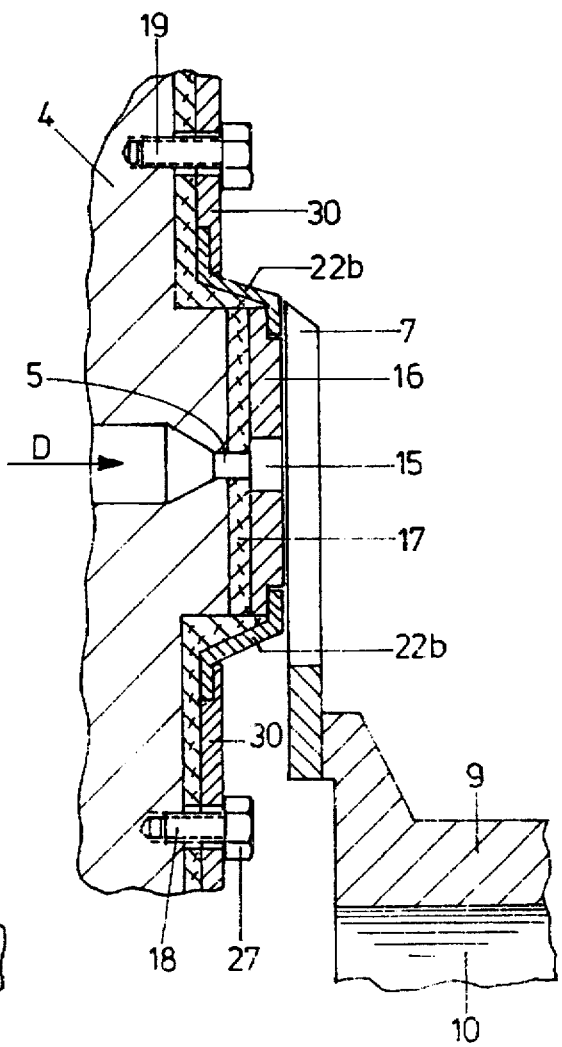

FIG. 4 shows another variant, the inner leg of the retainer and spacer element 22b not being directly penetrated by the screw 18 or 19, but indirectly by a section of a covering and retaining sheet 30.

FIG. 5 illustrates the conditions resulting for the product passage holes 15 from the "floating" support, according to the invention, of the wearing protection layer 16 when the pelletizing process is started.

Figure 5A:
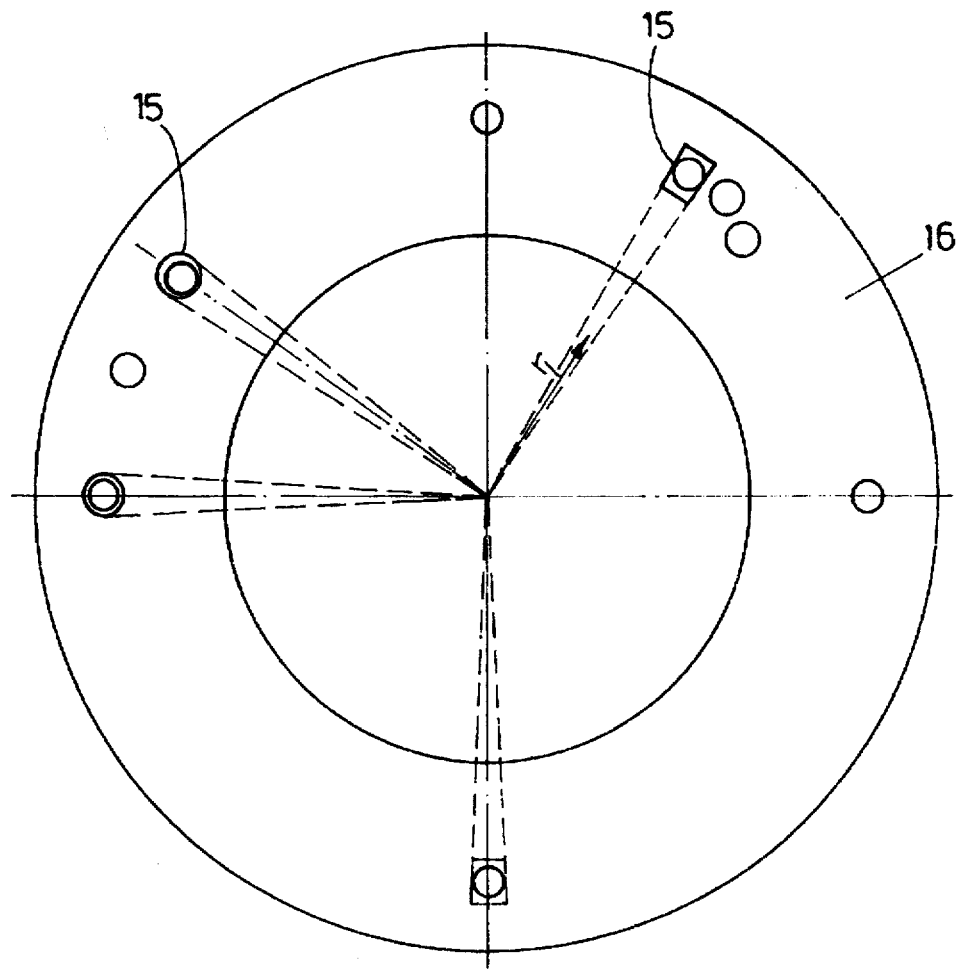
FIG. 5 shows configurations of the product passage holes.

FIG. 5a shows a plan view on the wearing protection layer 16 with the holes 15.

Figure 5B:
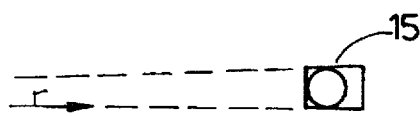
Figure 5B:
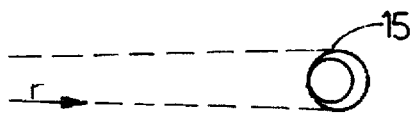

FIG. 5b respresents the situation prior to the start of the knives 7 and the water cooling, with heating already taking place. According to the details A and B, different forms of the holes 15 are considered, i.e. round holes that are simple to produce according to detail B, and trapezoidal holes according to detail A, the lateral edges of the trapezoid serving as cutting edges during the shearing of the plastic strands by the knife 7.

Figure 5C:
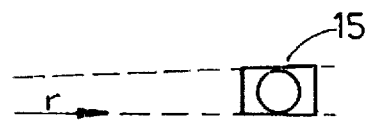
Figure 5C:
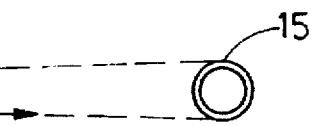

When, proceeding from the situation seen in FIG. 5b, the flow of water is started, the wearing protection layer 16 is cooled and radial displacement takes place in the direction towards the center of the circle of FIG. 5a relative to the base body 4 and the insulating layer 17 so that the relative positions shown in FIG. 5c result.

What is claimed is:

1. An underwater pelletizing die plate for an extruder that pelletizes thermoplastics, said die plate comprising
   said pelletizing die plate defining a plurality of die plate holes extending through a face of said pelletizing die plate,
   an insulating layer on said face, said insulating layer having a plurality of insulating die holes aligned with said die plate holes,
   a wear protection layer on said insulating layer, said wear protection layer having a plurality protection layer die holes aligned with said insulating die holes, said protection layer die holes being larger than said insulation die holes,
   mounting means mounting said wear protection layer on said insulating layer, and wherein when said wear protection layer is cooled radial displacement of said wear protection layer towards the center of said wear protection layer takes place relative to said insulation layer and said die plate.

2. A pelletizing die plate according to claim 1, wherein the insulating layer (17) consists of zirconium oxide.

3. The underwater die plate of claim 3 wherein said mounting means is a screw passing through a wear screw hole and a corresponding insulating screw hole in said insulating layer and into said die plate, said wear screw hole being larger than said screw and said screw being attached to said die plate to hold said wear protection layer on said die plate to allow radial movement of said wear protection layer with respect to said insulating layer.

4. The underwater die plate of claim 3 wherein said screw passes through a retainer and spacer that has an L-shape,
   said retainer being sized to hold said wear protection layer on said insulation layer and to allow radial movement of said wear layer with respect to said insulation layer.

5. The underwater die plate of claim 1 wherein said mounting means is a spacer and a retainer mounted to said die plate, said spacer and retainer being sized and positioned on said die plate to hold said wear protection layer on said insulation layer and to allow radial movement of said wear layer with respect to said insulation layer.

6. The underwater die plate of claim 3 wherein said insulating layer is zirconium oxide.

7. The underwater die plate of claim 4 wherein said insulating layer is zirconium oxide.

8. The underwater die plate of claim 5 wherein said insulating layer is zirconium oxide.

9. In a pelletizing extruder that has an underwater pelletizing die plate and a cutting head having pelletizing knives spaced from said pelletizing die plate to pelletize an extruded material, said die plate said pelletizing die plate defining a plurality of die plate holes extending through a face of said pelletizing die plate, an insulating layer on said face, said insulating layer having a plurality of insulating die holes aligned with said die plate holes, a wear protection layer on said insulating layer, said wear protection layer having a plurality protection layer die holes aligned with said insulating die holes, said protection layer die holes being larger than said insulation die holes, mounting means mounting said protection layer on said insulating layer, and wherein when said wear protection layer is cooled radial displacement of said protection layer towards the center of said wear protection layer takes place relative to said insulation layer and said die plate.

10. In the extruder of claim 9 wherein said mounting means is a screw passing through a wear screw hole, and a corresponding insulating screw hole in said insulating layer and into said die plate, said wear screw hole being larger than said screw and said screw being attached to said die plate to hold said wear protection layer on said die plate to allow radial movement of said wear protection layer with respect to said insulating layer.

11. In the extruder of claim 10 wherein said screw passes through a retainer and spacer that has an L-shape, said retainer being sized to hold said wear protection layer on said insulation layer and to allow radial movement of said protection wear layer with respect to said insulation layer.

12. In the extruder of claim 9 wherein said mounting means is a spacer and a retainer mounted to said die plate, said spacer and retainer being sized and positioned on said die plate to hold said wear protection layer on said insulation layer and to allow radial movement of said wear layer with respect to said insulation layer.

13. In the extruder of claim 9 wherein the insulating layer is zirconium oxide.

14. In the extruder of claim 10 wherein the insulating layer is zirconium oxide.

15. In the extruder of claim 11 wherein the insulating layer is zirconium oxide.

16. In the extruder of claim 12 wherein the insulating layer is zirconium oxide.

* * * * *